Dec. 17, 1968  G. A. HUGHES ET AL  3,417,081
SYNTHESIS OF GON-5(6) AND 5(10)-ENES
Filed April 7, 1966

INVENTORS
GORDON ALAN HUGHES
HERCHEL SMITH
BY J.J. Bellino
ATTORNEY

United States Patent Office 3,417,081
Patented Dec. 17, 1968

3,417,081
SYNTHESIS OF GON-5(6) AND 5(10)-ENES
Gordon Alan Hughes, Haverford, Pa., and Herchel Smith, 500 Chestnut Lane, Wayne, Pa. 19087, said Hughes assignor to said Smith
Continuation-in-part of aplication Ser. No. 228,384, Oct. 4, 1962. This application Apr. 7, 1966, Ser. No. 540,922
8 Claims. (Cl. 260—239.55)

This application is a continuation-in-part of co-pending application Ser. No. 228,384, filed Oct. 4, 1962; which in turn is a continuation of applications Ser. No. 57,904, filed Sept. 23, 1960, Ser. No. 91,341, filed Feb. 24, 1961, Ser. No. 137,535, filed Sept. 12, 1961, Ser. No. 195,000, filed May 15, 1962, and Ser. No. 196,557, filed May 16, 1962, all abandoned.

This invention relates to compositions of matter classified in the art of chemistry as substituted unsaturated-gonane derivatives, to intermediates therefor, and to processes for making and using such compositions.

In describing the invention, reference will be made in the following specification to the annexed drawings, wherein.

Figure 1:
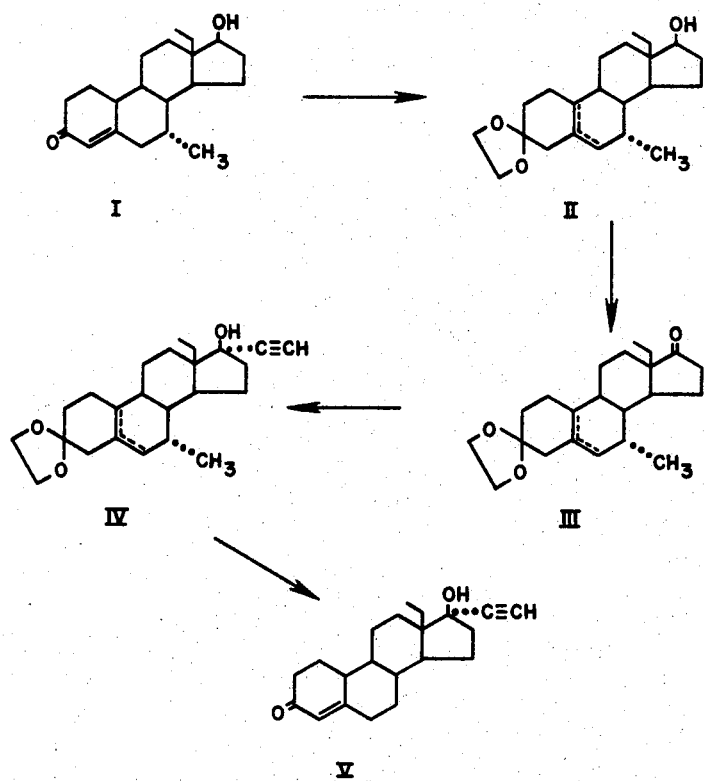
FIGURE 1 illustrates schematically the reaction sequence for preparing a 13-alkylgon-4-ene, specifically 13β-ethyl-17α-ethynyl-17β-hydroxy-7α-methylgon-4-en-3-one.

The invention sought to be patented, in its principal composition aspect, is described as residing in the concept of a mixture of a compound having a gon-5(10)-ene nucleus and the corresponding substituted compound having a gon-5-ene nucleus, both of said gonenes having attached thereto in their 13-position a monovalent polycarbon-alkyl radical (FIGURE 1, II).

The tangible embodiments of the composition aspect of the invention possess the inherent general physical properties of being white crystalline solids or colorless viscous gums, are substantially insoluble in polar solvents such as dimethylacetamide. Examination of compounds produced according to the hereinafter described process reveals, upon ultraviolet and infrared spectrographic analysis, spectral data supporting the molecular structures herein set forth. The aforementioned physical characteristics, taken together with the nature of the starting materials and the mode of synthesis, confirm the structure of the compositions sought to be patented.

The tangible embodiments of the composition aspect of this invention possess the use characteristic of being intermediates for the preparation of compositions exerting hormonal effects with unexpected separation of activity as evidenced by standard test procedures.

The invention sought to be patented, in the process of making the compositions aspect, is described as residing in the concept of treating a compound with a gon-4-en-3-one nucleus having attached thereto in the 13-position a polycarbon-alkyl radical, or alternatively a compound having a 3-alkoxygona-2,5(10)-diene nucleus having attached thereto in the 13-position a polycarbon-alkyl radical, with a dihydric alcohol in the presence of an acid catalyst to form an equilibrium mixture of the corresponding 3,3-alkylenedioxygon-5-ene and the 3,3-alkylenedioxygon-5(10)-ene.

The manner of making the chemical compounds, which are the starting materials for use in making the compounds of the invention, and for use in the processes of making the invention, are illustrated in a paper by Smith et al., Journal of the Chemical Society 1964, 4472 and in Belgian Patent 653,350.

The manner and process of making and using the invention will now be generally described so as to enable a person skilled in the art of chemistry to make and use the same as follows:

Referring now to FIGURE 1, wherein the compounds are assigned Roman numerals for identification schematically, the sequence of reactions involved in the synthesis of 13β-ethyl-17α-ethynyl-17β-hydroxy-7α-methylgon-4-en-3-one is illustrated. 13β-ethyl-17β-hydroxy-7α-methylgon-4-en-3-one (I) is refluxed with ethylene glycol in benzene in the presence of p-toluenesulfonic acid to form a mixture of 13β-ethyl-3,3-ethylenedioxy-17α-hydroxy-7α-methylgon-5-ene and 13β-ethyl-3,3-ethylenedioxy-17α-hydroxy-7α-methylgon-5(10)-ene (II). This mixture (II) is oxidized by the Oppenauer procedure with aluminum isopropoxide and cyclohexanone to give a mixture of 13β-ethyl-3,3-ethylenedioxy-7α-methylgon-5(10)-en-17-one and 13β-ethyl-3,3-ethylenedioxy-7α-methylgon-5-en-17-one (III). Ethynylation of this mixture (III) at the 17-position with lithium acetylide in dimethylacetamide gives a mixture of 13β-ethyl-3,3-ethylenedioxy-17α-ethynyl-7α-methylgon-5(10)-en-17β-ol and 13β-ethyl-3,3-ethylenedioxy-17α-ethynyl-7α-methylgon-5-en-17β-ol (IV), which is then hydrolyzed by hydrochloric acid in methanol to 13β-ethyl-17α-ethynyl-17β-hydroxy-7α-methylgon-4-en-3-one (V).

Figure 2:
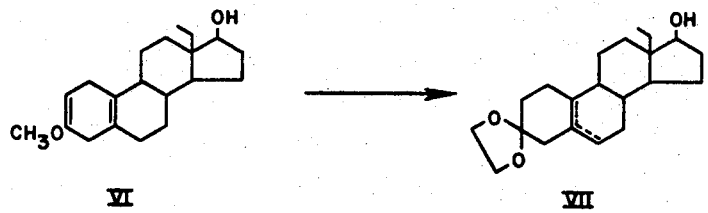
FIGURE 2 illustrates schematically the reaction for preparing a mixture of a 13-alkyl-3,3-alkylenedioxygon-5(10)-ene and a 13-alkyl-3,3-alkylenedioxygon-5-ene from a 13-alkylgona-2,5(10)-diene, specifically, a mixture of 13β-ethyl-3,3-ethylenedioxygon-5(10)-en-17-ol and a 13β-ethyl-3,3-ethylenedioxygon-5-en-17-ol from 13β-ethyl-3-methoxygona-2,5(10)-dien-17β-ol.

Referring now to FIGURE 2, wherein the compounds are assigned Roman numerals for identification schematically, the reaction involved in an alternate process for preparing a mixture of a gon-5-ene and the corresponding gon-5(10)-ene is illustrated. 13β-ethyl-3-methoxygona-2,5(10)-dien-17β-ol (VI) is refluxed with ethylene glycol and benzene in the presence of p-toluenesulfonic acid to obtain an equilibrium mixture of 13β-ethyl-3,3-ethylenedioxygon-5-en-17β-ol and 13β-ethyl-3,3-ethylenedioxygon-5(10)-en-17β-ol (VII).

The 6-carbon atom of the starting gonenone (I) and gonadiene (IV) can be substituted, as for example, with an alkyl group, such as methyl or ethyl. The 7-carbon atom of the starting gonenone (I) or gonadiene (IV) can be similarly substituted (e.g. FIGURE 1).

For the processes of the invention, and except for the limitations expressed in this specification, variations of the B-ring on the structures of the invention, or on the intermediates leading thereto, are full equivalents of each other.

The 1, 2 and 4-carbon atoms of the starting gonenone (I) and gonadiene (IV) can also be substituted, as for example, with an alkyl group, such as methyl or ethyl.

For the processes of the invention and except for the limitations expressed in this specification, variations of the A-ring on the structures of the invention, or on the intermediates leading thereto, are full equivalents of each other.

The 13-position of the starting gonenone (I) and gonadiene (IV), can be substituted with any polycarbon-alkyl group such as ethyl, n-propyl, isopropyl, butyl, isobutyl and hexadecyl. Further, starting gonenes may be prepared by methods given in the publications disclosed above wherein the 13-position is substituted with any organic radical. Thus, but without limiting the generality of the foregoing, an aralkyl, cycloalkylalkyl, or a polycarbonalkylene bridge bearing a hydroxy, amino, or alkylamino substituent can readily be placed at the 13-position, and from such compounds other variations of the 13-position substituent can be prepared, as haloalkyls from hydroxyalkyls, or quarternary salts, amides, alkenyls, etc. from aminoalkyls.

For the processes of the invention and except for the limitations expressed in this specification, variations at the 13-position of the structures of the invention or on the intermediates leading thereto are the full equivalents of the claimed 13-position polycarbon-alkyl substituents, having physiological activity of the same type.

In any of the intermediate structures or in the structures of the invention wherein the 17-position is carbonyl, the carbonyl group can be converted to a group such as hydroxymethylene by lithium aluminum hydride reduction; to acyloxymethylene by esterification of the hydroxymethylene group so formed; to alkoxymethylene by etherification of the hydroxymethylene group; to alkyl-hydroxymethylene by addition of the appropriate organometallic reagent to the carbonyl; or to alkynylhydroxymethylene by addition of the appropriate alkali metal acetylide in a suitable inert solvent; all in the known manner. The carbonyl group may also be ketalized or thioketalized by treating with the appropriate alcohol or glycol in a suitable solvent under acidic conditions, as in the presence of an acid such as sulfuric acid, p-toluenesulfonic acid, or boron trifluoride etherate, with heating where necessary, according to the known art.

The equilibrium mixture of the gon-5-ene and gon-5(10)-ene is prepared by ketalizing a gon-4-ene and a 3-methoxygon-2,5(10)-diene as described above for a ketalizing a 17-carbonyl. Ketalization of gon-5-(10)-en-3-ones and gon-5-en-ones under similar conditions also produces the same equilibrium mixture. When a 17 carbonyl group is present, the unsaturated 3-carbonyl can be selectively ketalized, or both carbonyl groups can be ketalized simultaneously by varying the conditions.

The mixture of 3-alkylenedioxygon-5 and 5(10)-enes can be converted to the corresponding gon-4-en-3-one by hydrolysis unnder acidic conditions such as hydrochloric acid or oxalic acid, with heating where necessary. The conversion can also be carried out by an exchange reaction with another ketone, such as acetone in the presence of an acid catalyst such as p-toluene sulfonic acid.

While the tetracyclic compounds in this specification and the appended examples are named to describe the configuration corresponding to that of the natural steroids, it is to be understood that unless otherwise indicated, the product of each of the given manipulative procedures is a racemic mixture which contains said named compound and its enantiomorph.

The followinng examples illustrate the manner of using the claimed processes of the invention for the preparation of the claimed compositions of the invention.

Example 1.—13β-ethyl-3,3-ethylenedioxygon-5-en-17β-ol and 13β-ethyl-3,3-ethylenedioxygon-5(10)-en-17β-ol Reflux 13β-ethyl-3-methoxygona-2,5(10)-diene-17β-ol (13 g.) in benzene (220 cc.) with ethylene glycol (50 cc.) and toluene-p-sulphonic acid (0.4 g.) for 36 hours, and then add 5% aqueous sodium bicarbonate (100 cc.) to the cooled solution. Separate, wash, and dry the organic layer and evaporate to give a gum which crystallizes on standing. Crystallize the product from ether-hexane to give an equilibrium mixture of the title products M.P. 130–139° C.

$C_{21}H_{32}O_3$ calculated: C, 75.86%; H, 9.7%. Found: C, 75.95%; H, 9.48%.

The mixture possesses androgenic activity and is useful as an intermediate for preparing compounds which have hormonal activity.

Example 2.—13β-ethyl-3,3-ethylenedioxygon-5-en-17-one and 13β-ethyl-3,3-ethylenedioxygon-5(10)-en-17-one Add chromium trioxide (4.9 g.) portionwise with stirring over 20 minutes to a mixture (4.9 g.) of 13β-ethyl-3,3 - ethylenedioxygon - 5 - ene-17β-ol and 13β-ethyl-3,3-ethylenedioxygon-5(10)-en-17β-ol in pyridine (70 cc.) at 0° C. under nitrogen. Keep the mixture at room temperature for 17 hours, then dilute with ethyl acetate (300 cc.) and filter through a column of neutral alumina.

Dissolve the gum eluted by ethyl acetate in ether and filter. Add hexane to the filtrate and concentrate the solution to obtain an equilibrium mixture of the title products (total 3.6 g.); infrared absorption peaks at 5.78, 9.03, 9.24, 9.55, 10.6μ.

$C_{21}H_{30}O_2$ calculated: C, 76.3%; H, 9.15%. Found: C, 76.4%; H, 9.15%.

This mixture is useful as an intermediate for preparing compounds which have hormonal activity.

Example 3.—13β-ethyl-3,3-ethylenedioxy - 17α - ethynylgon-5-en-17β-ol and 13β-ethyl-3,3-ethylenedioxy-17α-ethynylgon-5(10)-en-17β-ol Add 13β-ethyl-3,3-ethylenedioxygon-5-en-17-one and 13β-ethyl-3,3-ethylenedioxygon-5(10)-en-17-one (3.5 g.), the mixture of the preceding example in dimethylacetamide (100 cc.) with stirring under nitrogen to lithium acetylide (3.5 g.) in ethylenediamine (10 cc.) and dioxane (10 cc.). Stir the mixture for 5 hours and replace the nitrogen atmosphere by one of acetylene, and then add lithium acetylide (3.5 g.) in ethylene diamine (10 cc.)-dioxane (10 cc.). After 20 hours, pour the mixture onto crushed ice and extract the product with ether. Evaporate the washed and dried extracts and purify the resulting gum by chromatography on a Florex column. Dissolve the product in ethyl acetate and add hexane to precipitate 13β-ethyl-3,3-ethylenedioxy - 17α-ethynylgon-5-en - 17β-ol and 13β-ethyl-3,3-ethylenedioxy-17α-ethynylgon-5(10)-en-17β-ol (1.3 g.), M.P. 150–161° C.; infrared absorption peaks at 2.80, 3.05μ.

The mixture has progestational activity and is useful as an intermediate for preparing compounds which have hormonal activity.

Example 4.—13β,17α-diethyl-3,3 - ethylenedioxygon-5-en-17β-ol and 13β,17α-diethyl-3,3-ethylenedioxygon-5(10)-en-17β-ol Add 13β - ethyl-3,3-ethylenedioxy-17α-ethynylgon-5-en-17β-ol and 13β-ethyl-3,3 - ethylenedioxy-17α-ethynylgon-5(10)-en-17β-ol (an equilibrium mixture, 1 g.) in benzene (15 cc.) to a prehydrogenated suspension of palladized calcium carbonate (0.3 g.) in benzene (10 cc.) and shake the mixture in an atmosphere of hydrogen until two molecular equivalents of hydrogen have been absorbed (137 cc.) when uptake practically ceases. Filter the catalyst, evaporate the solvent and recrystallize the residue from methanol to give an equilibrium mixture of 13β,17α-diethyl-3,3-ethylenedioxygon-5-en-17β-ol and 13β,17α-diethyl-3,3-ethylenedioxygon-5(10)-17β-ol (0.35 g.); M.P. 91–97°.

$C_{23}H_{36}O_3$ calculated: C, 76.62; H, 10.07%. Found: C, 76.96; H, 9.8%.

This mixture possess progestational activity and is useful as an intermediate for preparing compounds which have hormonal activity.

Example 5.—13β-ethyl-3,3-ethylenedioxy-17β-hydroxy-7α-methylgon-5(10)-ene and 13β-ethyl-3,3-ethylenedioxy-17β-hydroxy-7α-methylgon-5-ene Reflux 13β-ethyl-17β-hydroxygon-4-en-3-one (3.0 g.) with acetic anhydride (45 cc.), acetyl chloride (24 cc.) and pyridine (2.4 cc.) for 3 hours. Evaporate to dryness under reduced pressure, dissolve the residue in benzene-ether and wash with water and brine. Evaporate the dried solution and triturate the residue with hot ether to obtain 3,17β-diacetoxy-13β-ethylgona-3,5-diene (3.125 g.), M.P. 148–156°; infrared absorption peaks at 5.68, 5.78, 6.0, 6.11μ; ultraviolet absorption maxima 238 mμ (ε19,500).

Add 3,17β-diacetoxy-13β-ethylgona-3,5-diene (1.0 g.) in acetone (20 cc.) to a solution of sodium acetate (2.72 g.) in acetone (86.0 cc.), pyridine (0.58 cc.), water (27.2 cc.) and acetic acid (2.72 cc.). Cool the mixture to 0° and add N-bromo succinimide (0.5 g.). Stir at 0° for 2 hours and then pour into ice cold brine (800 cc.). Extract the mixture with ether and wash the ethereal solution with ice-water and dry, not allowing the temperature to exceed 10°. Filter and remove most of the solvent at 15°. Add calcium carbonate (3.0 g.) and dimethylformamide (70 cc.) and remove the remaining ether by distillation. Reflux the suspension for one hour, cool, filter and pour the filtrate into water. Extract with ethyl acetate-ether and wash and dry the organic solution. Evaporate the solvent and recrystallize the residue from ethyl acetate-hexane to obtain 17β-acetoxy-13β-ethylgona-4,6-dien-3-one (0.475 g.), M.P. 163–166°; infrared absorption peaks at 5.77, 6.02μ; ultraviolet absorption maximum at 242 mμ (ε16,730).

$C_{20}H_{30}O_2$ calculated: C, 79.43; H, 10.00%.—Found: C, 79.11; H, 9.92%.

Add 17β-acetoxy-13β-ethylgona-4,6-dien-3-one (2.0 g.) in tetrahydrofuran (30 cc.) containing a trace of cuprous chloride to a stirred mixture of tetrahydrofuran (20 cc.), 3 molar ethereal methyl magnesium bromide (16.0 cc.) and cuprous chloride (0.2 g.) at 0°. Stir for 10 minutes, pour into ice-cold brine containing hydrochloric acid and extract with ether. Wash the ethereal solution with brine, 10% aqueous sodium hydroxide, water, brine and dry. Evaporate the solvent under reduced pressure and chromatograph the residue on neutral alumina (80.0 g.). Recrystallize the product from acetone-hexane to obtain 13β-ethyl - 17β - hydroxy-7α-methylgon-4-en-3-one (0.56 g.), M.P. 152–154°; infrared absorption peaks at 2.98, 6.02μ; ultraviolet absorption maximum at 242 mμ (ε16,730).

$C_{20}H_{30}O_2$ calculated: C, 79.43; H, 10.00%.—Found: C, 79.11; H, 9.92%.

Reflux 13β-ethyl-17β-hydroxy-7α-methylgon-4-en-3-one (1.35 g.) with benzene (100 cc.) and ethylene glycol (10 cc.) containing p-toluenesulfonic acid monohydrate (0.067 g.) for 6 hours with continuous removal of water. Cool, wash with saturated aqueous sodium bicarbonate, dry, and remove the solvent to obtain a mixture of the title compounds as a gum (1.20 g.); infrared absorption peak at 2.90μ.

This mixture is useful as an intermediate for preparing compounds which have hormonal activity.

Example 6.—13β-ethyl-3,3-ethylenedioxy-7α - methylgon-5(10)-en-17-one and 13β-ethyl-3,3-ethylenedioxy - 7α-methylgon-5-en-17-one Dissolve a mixture of 13β-ethyl-3,3-ethylenedioxy-17β-hydroxy-7α-methylgon-5(10)-ene and 13β-ethyl-3,3-ethylenedioxy-17β-hydroxy-7α-methylgon-5-ene (1.20 g., prepared as described above) in toluene (40 cc.) and cyclohexanone (10 cc.) and azeotrope to remove water. Add aluminum isopropoxide (0.8 g.) in toluene (10 cc.) and reflux in a nitrogen atmosphere for 3.5 hours. Add water (0.5 cc.) to the cooled reaction mixture followed by anhydrous sodium sulfate (6.0 g.). Stir for 10 minutes, filter, remove the solvent under reduced pressure and heat the residue at 120°/0.3 mm. to obtain a mixture of the title products as a viscous gum; infrared absorption peaks at 2.9 and 5.75–5.85μ.

This mixture is useful for preparing compounds which have hormonal activity.

Example 7.—13β-ethyl-3,3-ethylenedioxy-17α-ethynyl-7α-methylgon-5(10)-ene-17β-ol 13β-ethyl-3,3 - ethylenedioxy-17α-ethynyl-7α-methylgon-5(6)-en-17β-ol Dissolve the crude mixture of 13β-ethyl-3,3-ethylenedioxy-7α-methylgon-5(10)-en-17-one and 13β - ethyl - 3,3-ethylenedioxy-7α-methylgon-5(6)-en-17-one (ca. 1 g. prepared as in the previous example) in dimethylacetamide (50 cc.), add lithium acetylide-ethylenediamine complex (1.0 g.) and stir the mixture in an atmosphere of acetylene for 2 hours. Pour the mixture onto ice, extract with ether, and wash, dry, and evaporate the ethereal solution to obtain a title mixture of the title products as a gum (0.8 g.).

This mixture is useful for preparing compounds which have hormonal activity.

Example 8.—13β-ethyl-17α-ethynyl-17β-hydroxy-7α-methylgon-4-en-3-one

Dissolve the crude mixture of 13β-ethyl-3,3-ethylenedioxy-17α-ethynyl-7α-methylgon-5(10)-en-17β-ol and 13β-ethyl-3,3-ethylenedioxy-17α-ethynyl-7α - methylgon-5(6)-en-17β-ol (0.8 g. prepared as in the previous example) in methanol (50 cc.), concentrated hydrochloric acid (3.0 cc.) and water (2.0 cc.) and stir for 1½ hours in an atmosphere of nitrogen. Pour the mixture into brine, extract with ether and wash, dry and evaporate the ethereal solution to obtain a crude solid, M.P. 170–175°. Chromatograph on Florex (40 g.), eluting with benzene and recrystallize from ethyl acetate-hexane to obtain the title compound (0.55 g.), M.P. 182–184°; infrared absorption peaks at 2.0, 3.1, 4.8, 6.09μ; ultraviolet absorption maximum at 240 mμ (ε16,500).

$C_{22}H_{30}O_2$ calculated: C, 80.92; H, 9.26%.—Found: C, 80.62; H, 9.13%.

This compound has progestational and myotrophic activity.

Example 9.—13β-ethyl-3,3-ethylenedioxy-17α-ethynylgon-5-en-17β-ol and 13β-ethyl-3,3-ethylenedioxy-17α-ethynylgon-5(10)-en-17β-ol Reflux 13β-ethyl-17α-ethynyl-17β-hydroxygon-4-en-3-one (2 g.) in benzene (200 cc.) with p-toluenesulfonic acid (1 g.) with ethylene glycol (10 cc.) for 7 hours. Wash the cooled solution with saturated aqueous sodium bicarbonate, water and dry. Evaporate the solvent to leave as residue a crude mixture of the title compounds.

This mixture has progestational activity and is useful as an intermediate for preparing compounds which have hormonal activity.

Example 10.—13β-ethyl-3,3-ethylenedioxy - 17α-ethynylgon-5-en-17β-ol, hemisuccinate methyl ester and 13β-ethyl-3,3-ethylenedioxy-17α - ethynylgon-5(10)-en-17β-ol, hemisuccinate methyl ester Dissolve 13β-ethyl-3,3-ethylenedioxy-17α-ethynylgon-5-en-17β-ol and 13β-ethyl-3,3-ethylenedioxy-17α-ethynylgon-5(10)-en-17β-ol (2.5 g., the mixture from the previous example) in dry 1,2-dimethoxyethane (45 cc.) and 0.93M ethereal ethyl magnesium bromide (16 cc.). After allowing to stand for 5 minutes, add β-carbomethoxy propionyl chloride (2.4 g.) and allow the mixture to stand for 16 hours at 25° and then reflux for 25 hours. Add dimethylaminopropylamine (3 cc.) to the cooled solution, pour the mixture into brine and extract with benzene. Wash the organic solution with dilute hydrochloric acid, water, brine and dry. Evaporate the solvent to obtain a mixture of the title compounds as an orange gum (2.0 g.); infrared absorption peak at 5.75μ.

This mixture is useful as an intermediate for preparing compounds which have hormonal activity.

Example 11.—13β-ethyl-17α-ethynyl-17β-hydroxygon-4-en-3-one, hemisuccinate methyl ester Dissolve 13β-ethyl-3,3-ethylenedioxy-17α-ethynylgon-5-en-17β-ol, hemisuccinate methyl ester and 13β-ethyl-3,3-ethylenedioxy-17α-ethynylgon-5-(10)-en-17β-ol, hemisuccinate methyl ester (2.0 g., the mixture from the previous example) in acetone (300 cc.) containing p-toluene sulfonic acid monohydrate (0.3 g.) and reflux for 1 hour. Remove most of the solvent under reduced pressure, add water and ether and wash, dry and evaporate the organic solution. Filter the residue through neutral alumina (70 g.) with petroleum-benzene (1:1) to elute a gum. Wash the column with benzene to obtain a solid and recrystallize from ether-hexane to obtain the title compound (0.3 g.), M.P. 127–130°; infrared absorption peaks at 3.1, 5.75, 6.0μ; ultraviolet absorption at 240μ (ε17,280).

$C_{26}H_{34}O_5$ calculated: C, 73.21 H, 8.04%.—Found: C, 73.31; H, 8.07%.

Example 12.—13β-ethyl-3,3-ethylenedioxy-6-methylgon-5-en-17-one and 13β-ethyl-3,3-ethylenedioxy-6-methylgon-5(10)-en-17-one Add 3-methoxy-6-methyl-13β-ethylgona-1,3,5(10)-trien-17β-ol (6.8 g.) in tetrahydrofuran (200 cc.) to liquid ammonia (800 cc.) containing tetrahydrofuran (250 cc.). Add lithium (3.5 g.) portionwise and stir for 1.75 hours. Discharge the blue color by dropwise addition of ethanol over 0.25 hour followed by water (2000 cc.) Filter, wash, and dry the residue to obtain 3-methoxy-6-methyl-13 ethylgona-2,5(10)-dien-17β-ol (6.5 g.), M.P. 176–182°; infrared absorption peaks at 3.05, 5.90, 6.0μ.

Stir 3-methoxy-6-methyl-13β-ethylgona-2,5(10)-dien-17β-ol (1.0 g.) in methanol (54 cc.) containing concentrated hydrochloric acid (3.6 cc.) and water (2.4 cc.) under nitrogen for 1.5 hours. Pour into brine, extract with either. Wash, dry and evaporate the organic solution and chromatograph the residue on neutral alumina (50 g.). Recrystallize from ether-hexane to obtain 13β-ethyl-17β-hydroxy-6α-methylgon-4-en-3-one (0.3 g.), M.P. 127–130°; ultraviolet absorption maximum 240μ (ε16,500).

$C_{20}H_{30}O_2$ calculated: C, 79.42; H, 10.00%.—Found: C, 79.57; H, 9.87%.

Dissolve 13β-ethyl-17β-hydroxy-6α-methylgon-4-en-3-one (6.0 g.) in acetone (300 cc.) and add 8 N chromic acid dropwise until the solution remains orange. Add solid sodium bicarbonate, filter, evaporate the filtrate and recrystallize the residue from ethyl acetate to obtain 13β-ethyl-6α-methylgon-4-ene-3,17-dione (0.8 g.), M.P. 163–166°; ultraviolet absorption maximum 240μ (ε15,800).

Dissolve 13β-ethyl-6α-methylgon-4-ene-3,17-dione (0.5 g.) in benzene (50 cc.) and reflux with ethylene glycol (0.11 cc.) and p-toluenesulfonic acid monohydrate (0.0055 g.) for 4 hours. Basify the cooled solution with alcoholic potassium hydroxide and wash with water until the washings are neutral. Dry and evaporate the solvent to obtain a mixture of the title compounds as a crude gum (0.5 g.).

This mixture is useful as an intermediate for preparing compounds which have hormonal activity.

Example 13.—13β-ethyl-3,3-ethylenedioxy-17α-ethynyl-6-methylgon-5-en-17β-ol and 13β-ethyl-3,3-ethylonedioxy-17α-ethynyl-6-methylgon-5(10)-en-17β-ol Dissolve 13β-ethyl-3,3-ethylenedioxy-6-methylgon-5-en-17-one and 13β-ethyl-3,3-ethylenedioxy-6-methylgon-5(10)-en-17-one (the crude gum from the previous example) in dimethylacetamide (30 cc.) and stir in an atmosphere of acetylene with a 15.8% suspension of lithium acetylide-ethylenediamine complex in dioxan (10 cc.) for 4 hours. Pour onto ice, extract with ether and wash, dry and evaporate the solvent to obtain a mixture of the title products in a solid (0.14 g.), M.P. 225–230°; infrared absorption peaks 2.95, 3.1μ.

This compound is useful as an intermediate for preparing compounds which have hormonal activity.

Example 14.—13β-ethyl-17α-ethynyl-17β-hydroxy-6α-methylgon-4-en-3-one

Dissolve 13β-ethyl-3,3-ethylenedioxy-17α-ethynyl-6-methylgon-5-en-17β-ol and 13β-ethyl-3,3-ethylenedioxy-17α-ethynyl-6-methylgon-5-(10)-en-17β-ol (0.14 g.) in methanol (30 cc.) and stir with concentrated hydrochloric acid (2 cc.) and water (2 cc.) at 100° for 45 minutes. Pour into brine, filter and dry the residue and recrystallize from ethyl acetate-hexane to obtain the title compound (0.06 g.), M. P. 147–151°; infrared absorption peaks at 6.04μ.

This compound has progestational and estrogen antagonistic activity.

The subject matter which applicants regard as their invention is particularly pointed out and distinctly claimed as follows:

1. The composition of matter consisting of 13β-ethyl-3,3-ethylendioxygon-5-en-17β-ol in admixture with its 5(10)-isomer.
2. The composition of matter consisting of 13β-ethyl-3,3-ethylenedioxygon-5-en-17-one in admixture with its 5(10)-isomer.
3. The composition of matter consisting of 13β-ethyl-3,3-ethylenedioxy-17α-ethynylgon-5-en-17β-ol in admixture with its 5(10)-isomer.
4. The composition of matter consisting of 13β,17α-diethyl - 3,3 - ethylenedioxygon-5-en-17β-ol in admixture with its 5(10)-isomer.
5. The composition of matter consisting of 13β-ethyl-3,3-ethylenedioxy-17β-hydroxy-7α-methylgon-5-ene in admixture with its 5(10)-isomer.
6. The composition of matter consisting of 13β-ethyl-3,3-ethylenedioxy-7α-methylgon-5-en-17-one in admixture with its 5(10)-isomer.
7. The composition of matter consisting of 13β-ethyl-3,3-ethylenedioxy-6-methylgon-5-en-17-one in admixture with its 5(10)-isomer.
8. The composition of matter consisting of 13β-ethyl-3,3-ethylenedioxy-17α-ethynyl-6-methylgon-5-en-17β-ol in admixture with its 5(10)-isomer.

References Cited

Zderic et al.; J.A.C.S., 81, pages 3120–24 (1959).

HENRY A. FRENCH, *Primary Examiner*.

U.S. Cl. X.R.

260—397.4; 167—74